March 24, 1925. 1,531,040
T. C. STEIMER
LEER FEEDING MECHANISM
Original Filed Feb. 12, 1910   2 Sheets-Sheet 2

Charles M. Steimer
Executor of
Theodore C. Steimer

By Dorsey ——
Attorney

Patented Mar. 24, 1925.

1,531,040

UNITED STATES PATENT OFFICE.

THEODORE C. STEIMER, DECEASED, LATE OF PITTSBURGH, PENNSYLVANIA; BY CHARLES M. STEIMER, EXECUTOR, OF PITTSBURGH, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE.

LEER-FEEDING MECHANISM.

Original application filed February 12, 1910, Serial No. 543,582. Divided and this application filed May 18, 1920. Serial No. 382,354.

*To all whom it may concern:*

Be it known that THEODORE C. STEIMER, deceased, a citizen of the United States of America, who resided in the city of Pittsburgh, did, during his life-time, invent certain new and useful Improvements in Leer-Feeding Mechanisms, of which the following is a specification.

This application is a division of an application filed Feb. 12, 1910, Sr. No. 543,582, and relates to means for collecting glass articles and feeding the same to a leer for annealing. The devices for this purpose as shown herein comprise a feeding wheel overlapping, at one part of the periphery, a conveyor, by which the finished articles when delivered thereto, may be conveyed through a leer, means for loading the glass articles on the wheel to be carried thereby over the conveyor, and means for transferring such articles from the wheel to the conveyor, the delivery means being so constructed that the articles are delivered in rows to the conveyor.

The invention further consists in the construction, arrangement and combination of the parts of which it is composed, as will be hereinafter more fully described and claimed.

Referring to the accompanying drawings in which corresponding parts are designated by corresponding marks of reference;—

Figure 3 is a fragmental view of the mechanism shown in the other figures, showing parts in position assumed while delivering articles to the leer conveyor.

Figure 1:
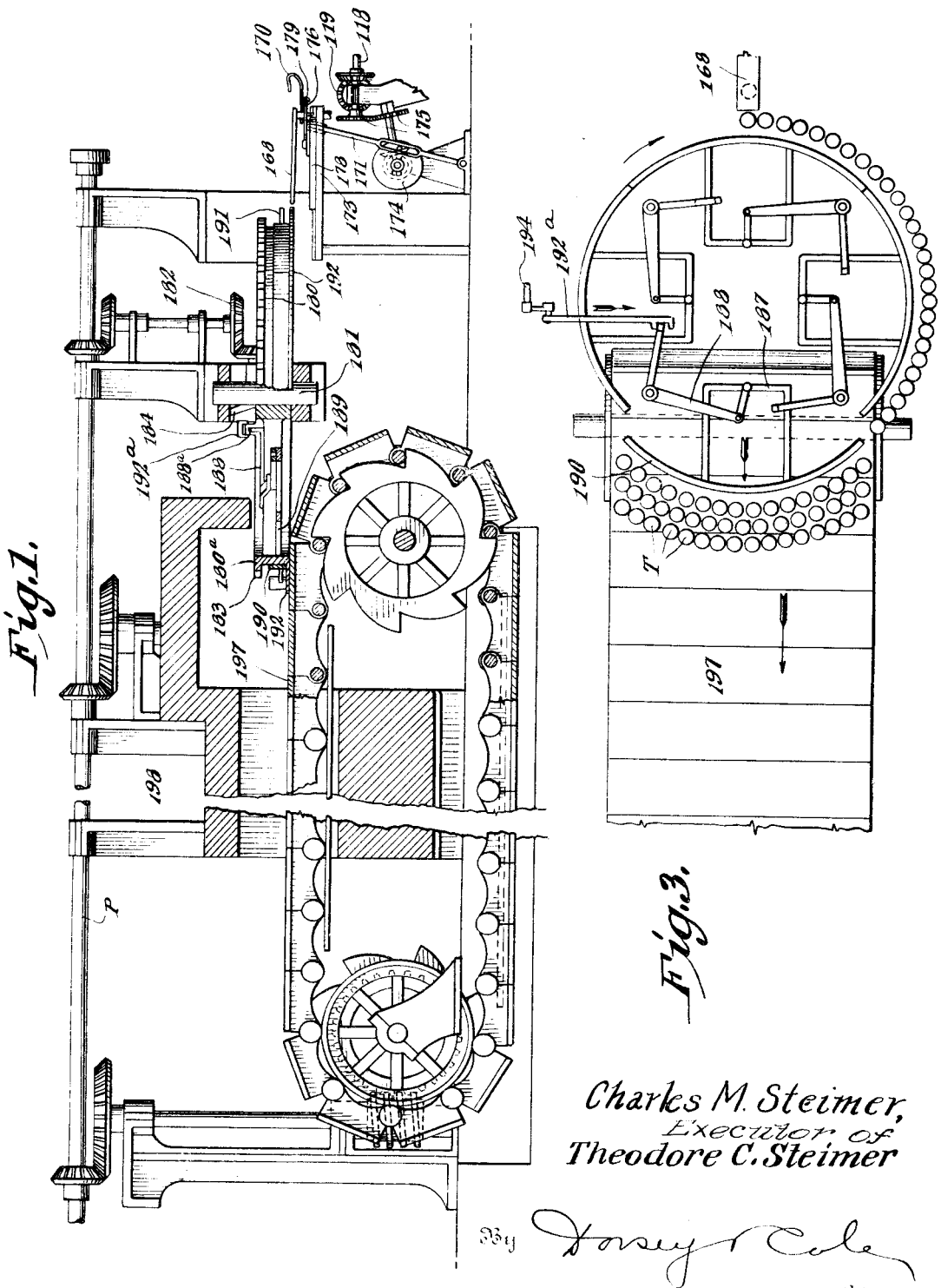
Figure 1 is a vertical central section through an annealing leer, and a feeding mechanism therefor, embodying the invention sought to be protected.
Figure 2:
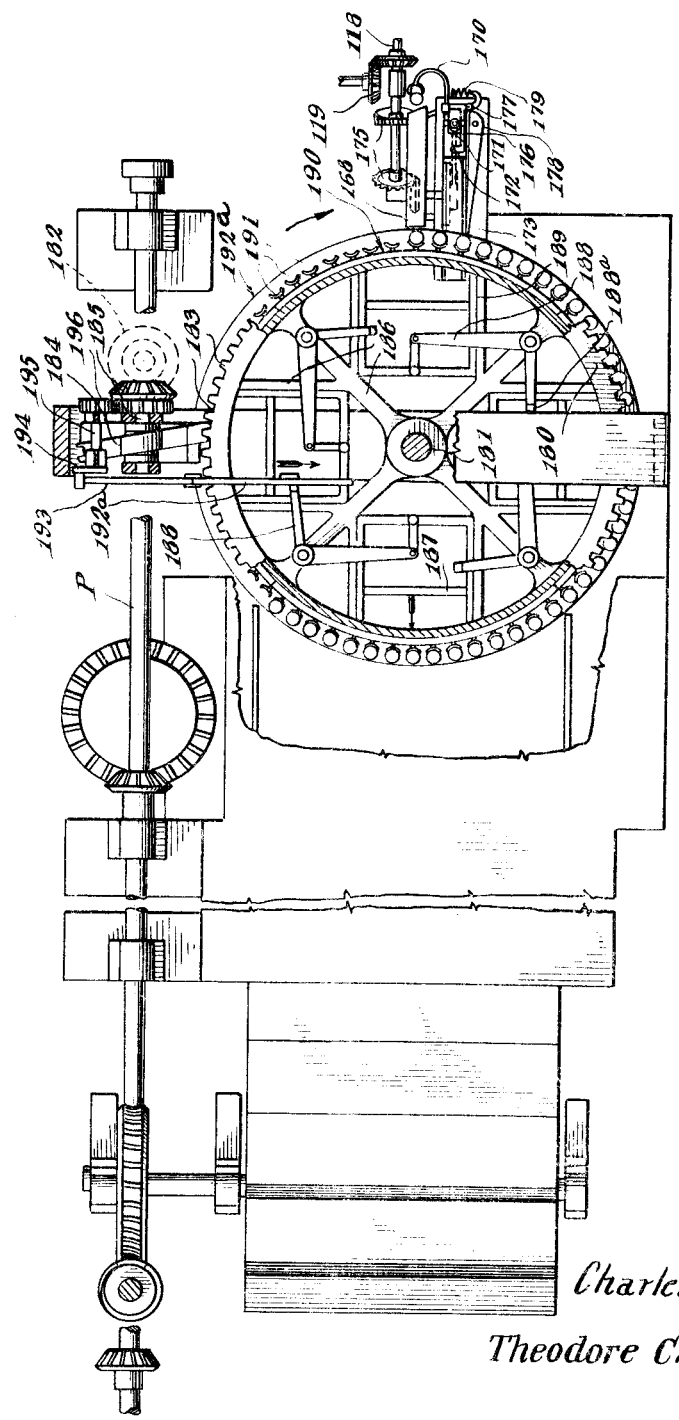
Figure 2 is a plan view thereof.

In the device shown, articles to be annealed, for instance, tumblers, are delivered one by one in any suitable manner to the rear end of a table 168, and are fed therefrom, one by one, by a carrier arm 170, to a rotating collector 180, in the form of a wheel, as the latter feeds past the table. Afterwards, by an outward motion of a movable section 190 of the collector, a whole row of articles is shoved onto a movable carrier 197, which passes slowly through an annealing leer 198.

The carrier arm 170 which feeds the articles from the table 168 to the collector is reciprocated by a lever arm 171 engaging the sliding block 172 in the slotted table 173. The arm 171 is moved by a pin-and-slot engagement with a disc 174 operated by gearing 175 from the power shaft 118. The lateral motion of the carrier arm 170, necessary to enable it to go behind the tumbler on the table 168, is attained by pivoting on the block 172 a frame 176 immediately supporting the carrier-arm 170, and this frame is swung on its pivot by engagement of roller stud 177 with a cam switch 178 on the table 173, the frame 176 being returned to normal position by spring 179.

It will be understood that the carrier arm 170 moves the article along the table 168 and these articles are to be taken up by the collector one by one. For this purpose the collector consists of an intermittently revolving frame 180 mounted on a shaft 181 driven from any convenient gearing 182 from the power shaft P. This frame 180 is provided on the upper flange of its rim 180$^a$ with a continuous series of studs 183, (preferably provided with rollers) acting as gear teeth, and engaging interrupted worm cam 184, having its cam slot arranged so as to move the table a definite distance intermittently, while its shaft continuously rotates. The rotating frame-work has a series of guides 186 in which radially slide frames 187, movable by links and bell crank levers 188 as hereafter described, the side arms 189 of the frames 187 passing through the rim 180$^a$, and supporting on the outside of the rim a series of separate ring sections 190 on which are fixed a series of forks 191. A supporting plate 192, is attached to the bottom of the rim 180$^a$ and serves as a supporting disk to maintain the tumblers in position within the forks 191 after they are placed on the edges of the disc and within the forks by the carrier arm 170 sliding them over table 168. It will be understood that one of these forks 191 momentarily stops at the table 168 with each revolution of the driving cam 184. Thus the articles are collected one by one and carried around to the position shown within the leer 198 and over the traveling table 197 therein.

The ring sections 190 are adapted to the size of the leer table and when one of them arrives at the delivery position, i. e., over the table 197, an upturned stud 188ª on the tail end of the bell-crank lever 188, arrives within a notch in the reciprocating bar 192ª. This is moved by a link 193 engaging a wrist pin on crank arm 194 on shaft 195 driven from shaft 185 by gear 196. The inward movement of the bar 192ª thus causes a radial outward movement of the frame 187 which happens to be at this point at this time, and by this outward movement of the carrier ring section 190 thereon, the whole row of tumblers supported by the plate 192 on the outside of the section, is shoved off of the plate on to the traveling table 197 of the leer 198, as shown in Figure 3. This motion being quickly performed does not interfere with the continuous motion of the leer table and it will be of course understood that the articles are carried slowly through the leer in the usual way. Of course, the movements of the collector machine and the leer table are so timed that the sets of articles are placed in proper order as shown in Fig. 3.

Having thus described this invention what is claimed is:—

1. In a leer feeding mechanism, the combination of a leer and continuously moving means for feeding articles therethrough, of a rotary wheel adapted to receive and support from below the articles, means for feeding articles to the wheel, and means for shoving articles from off the wheel and on to the continuously moving means.

2. In a leer feeding mechanism, the combination with a travelling leer conveyor, of a rotating disc overlapping the conveyor, and intermittent acting means for shoving on each actuation thereof, a number of articles from off the disc onto the conveyor, and assembling them upon the latter in a row.

3. In a leer feeding mechanism, the combination with a travelling leer conveyor, of a rotating disc overlapping the conveyor, and adapted to support the articles to be fed, a member for shoving the articles from off the disc onto the conveyor, and means for moving said member across the conveyor while the transfer is being effected.

4. In a leer feeding mechanism, the combination with a travelling leer conveyor, of a rotating disc overlapping the conveyor, and adapted to support the articles to be fed, a member movable in a path which is a closed curve, and means for moving the member in such path and for projecting it radially of the disc when over the conveyor to shove the articles onto the conveyor.

5. In a leer feeding mechanism, the combination with a travelling leer conveyor, of a rotating disc overlapping the conveyor, and a transfer member moving about the same center as the disc, for transferring articles from the disc to the conveyor, and means for moving the member about such center.

6. In a leer feeding mechanism, the combination with a travelling leer conveyor, of a rotating wheel overlapping the conveyor, and having a plurality of movable members rotating with the wheel, and means for projecting the several members to shove the articles from off the wheel onto the conveyor.

7. In a leer feeding mechanism, the combination with a travelling leer, a conveyor; of a rotating wheel overlapping the conveyor and having a peripheral flange to support the articles to be fed, and having a plurality of movable rim sections, and means for projecting the sections to feed the articles from off the flange to the conveyor.

8. In a leer feeding mechanism, the combination with a traveling leer conveyor of a rotating disc overlapping the conveyor, means for placing articles on the disc in a predetermined arrangement, and means for moving a group of the articles laterally from the disc to the conveyor in the same arrangement and in the same end to end relation as on the disc.

CHARLES M. STEIMER,
*Executor of the Estate of Theodore C. Steimer, Deceased.*